(12) United States Patent
Leiter et al.

(10) Patent No.: US 7,294,258 B2
(45) Date of Patent: Nov. 13, 2007

(54) DEVICE FOR CHEMICALLY/PHYSICALLY TREATING DRINKING WATER

(75) Inventors: Klaus Leiter, Völs (AT); Gerhard Walder, Zirl (AT); Franz Mair, Birgitz (AT)

(73) Assignee: Watercryst Chemiefreie (AT)

( * ) Notice: Subject to any disclaimer, the term of this patent is extended or adjusted under 35 U.S.C. 154(b) by 44 days.

(21) Appl. No.: 10/468,581

(22) PCT Filed: Jan. 25, 2002

(86) PCT No.: PCT/AT02/00032

§ 371 (c)(1),
(2), (4) Date: Mar. 3, 2004

(87) PCT Pub. No.: WO02/066384

PCT Pub. Date: Aug. 29, 2002

(65) Prior Publication Data

US 2004/0129620 A1   Jul. 8, 2004

(30) Foreign Application Priority Data

Feb. 20, 2001 (AT) .............................. A 258/2001
Mar. 2, 2001 (AT) .............................. A 334/2001

(51) Int. Cl.
*C02F 5/00* (2006.01)
(52) U.S. Cl. ................ 210/175; 210/275; 210/282
(58) Field of Classification Search ................ 210/175, 210/181, 184, 186, 263, 275, 282, 687, 702, 210/714
See application file for complete search history.

(56) References Cited

U.S. PATENT DOCUMENTS

| | | | | |
|---|---|---|---|---|
| 426,918 A | * | 4/1890 | Churchill | 210/184 |
| 630,327 A | * | 8/1899 | Clower | 210/186 |
| 649,116 A | * | 5/1900 | Strikel | 210/181 |
| 2,861,689 A | | 11/1958 | Lyall | 210/175 |
| 4,662,314 A | | 5/1987 | Moore, Jr. | 122/379 |

FOREIGN PATENT DOCUMENTS

| | | |
|---|---|---|
| AT | 406826 B | 9/2000 |
| AT | 409261 B | 7/2002 |
| DE | 39 06 715 | 9/1990 |
| GB | 1337990 | 11/1973 |
| GB | 1 337 990 | 11/1974 |
| GB | 1373990 | 11/1974 |
| WO | WO 99/48822 | 9/1999 |
| WO | WO 01/13045 | 2/2001 |

OTHER PUBLICATIONS

International Search Report (English language version) for PCT/AT02/00032 prepared by the EPO.

* cited by examiner

*Primary Examiner*—Matthew O. Savage
(74) *Attorney, Agent, or Firm*—Lorusso & Associates (57) ABSTRACT

The invention relates to a device for physically treating drinking water, in particular, for reducing the formation of limestone. The invention device comprises at least one water inlet (3b) and at least one water outlet (3c), whereby the device is mounted in the cold water supply line (3) of at least one water heater (1), preferably a boiler, and the device is placed in good heal-conductive thermal contact with the hot water area of the water heater (1).

19 Claims, 8 Drawing Sheets

DEVICE FOR CHEMICALLY/PHYSICALLY TREATING DRINKING WATER

BACKGROUND OF THE INVENTION

The present invention concerns a water heater—in particular a boiler—comprising an apparatus for the physical treatment of drinking water for reducing calcification, wherein the apparatus has at least one water inlet and at least one water outlet.

PCT application WO 99/48822 describes that a weakly acid ion exchanger resin in the Ca-form catalytically triggers at its surface lime precipitation from a lime-bearing solution. That process can be used for physical water treatment: the lime seed crystals formed at the surface of the catalytically acting granular material are easily detached from the surface and are crystallisation centers in the supersaturated water itself. The growth of those crystallisation centers binds the excess calcium and carbonate ions to themselves and in that way precipitation processes on pipe and boiler walls are lastingly suppressed. PCT application WO 99/48822 also contains technical descriptions of how preferably water treatment apparatuses with that catalyst material are designed and used in a drinking water installation. Essentially those water treatment apparatuses are made up of a pressure-resistant container, a nozzle plate and a granular material-retaining filter element. The original idea was to install that catalyst technology in the cold water line of the drinking water installation.

It was subsequently found that this catalyst granular material is most effectively used in the hot water region in combination with a hot water storage unit, more specifically for the following reasons:

The degree of supersaturation of the lime-bearing water is higher in the hot water region; in a corresponding manner the probability of seed crystals forming at the surface of the catalyst granular material also increases.

The growth kinetics of the lime seed crystals formed are substantially faster at higher temperatures; in other words, lime seed crystals formed are available more quickly as crystallisation centers.

In drinking water heating systems with storage unit the water involved has a markedly longer mean residence time in the system. That residence time permits a longer water treatment time. That permits efficient water treatment even with small compact catalyst units.

With warm or hot water the catalyst granular material can be ideally disinfected; disinfecting is desirable for safe operation in the drinking water sector by virtue of the large surface area of the material involved, from the hygiene point of view.

Those reasons led to the catalyst granular material preferably being used in the hot water region. In order to ensure protection for the entire drinking Water heating system, it is necessary for all the hot water to be brought into contact with the catalyst. That requirement is satisfied for example if the water treatment apparatus is either used in an existing circulation conduit and the hot water is circulated with a circulation pump or alternatively its own bypass conduit is built by way of the hot water storage unit and the water treatment apparatus is integrated into that conduit together with a circulation pump.

Austrian patent specification AT 406 826B in FIG. 2 thereof shows an embodiment for the use of the catalyst granular material in the hot water circulation. That specification shows an apparatus for disinfecting a water treatment unit, which is installed as an independent device in the cold water part or the hot water part of a drinking water installation. The incorporation of such an additional device gives rise to additional expenditure and requires a greater amount of space. In addition that additional device requires a power supply for heating the water to be treated. That gives rise to an additional energy consumption which cannot be completely recovered by the heat losses which occur, in the drinking water installation.

The technical solution with a circulation conduit has two crucial disadvantages:

the system needs a circulation conduit with a circulation pump and power for operation thereof, and there are heat losses due to the circulation.

Those disadvantages disturb the otherwise impeccable ecological and economic balance sheet of the catalyst technology. The process itself of forming the seed crystals does not need any chemical additives—it is a 'chemical-free' process—and no energy as the energy necessary for formation is stored in the supersaturation of the lime-bearing aqueous solution. The subsequent installation of a circulation conduit with a circulation pump increases the level of capital investment expenditure and operation of the circulation gives rise to operating costs. Particularly in the case of small installations, those circumstances have a particularly disadvantageous effect on the decision on the part of a customer for adopting that technology. Furthermore, when using layer-type storage arrangements, circulation by way of the storage unit gives rise to problems.

It is also known for the water-treating substance, preferably the catalyst granular material, to be integrated in a technical fluid-filled installation directly into the region where for example the lime problems occur. The technical installation itself is routinely provided not solely for receiving the water-treating substance, preferably the catalyst granular material, and performs another, technically necessary purpose. This can be for example the supply (storage/buffering) of a fluid, in particular the storage of hot water (energy storage) for later consumption. The technical installations described can also serve for heating fluids, passing the fluid along, or a combination of the stated functions.

It is assumed in this respect that transport, which is necessary for the treatment, of the fluid to the catalyst granular material and transport of the crystallisation centers which are necessary for the water treatment from the surface of the catalyst granular material into the entire fluid-filled space is effected to a sufficient degree by means of diffusion and convection. Diffusion and convection however are generally very slow processes and it is not always possible to guarantee an adequate treatment efficiency in the entire fluid-filled space. In addition specific adaptation of the listed embodiments in order to permit diffusion and convection to an adequate degree in the respective use sometimes requires a high level of technical expenditure which again nullifies a part of the savings (no pressure vessel, no heating means).

SUMMARY OF THE INVENTION

Therefore the object of the invention is that of so designing and arranging a water treatment unit for the reduction of calcification as to achieve a definite reduction in calcification in a structurally simple fashion.

In accordance with the invention that is achieved in that the apparatus is arranged in the cold water feed of the water heater and is in good heat-conductive thermal communication with the hot water region of the water heater and in addition has a modified weakly acid ion exchanger material for catalytic lime precipitation—preferably in Ca-form or in the form of granular material—as at least one water-treating substance.

It is thus provided that in the water heater according to the invention the apparatus on the one hand is installed in the cold water feed of the water heater and on the other hand is heated at the same time by the hot water region of the water heater. By virtue of that arrangement the apparatus is admittedly in good heat-conductive and direct thermal communication with the hot water region of the water heater, but does not have the hot water therefrom flowing directly through it. Admittedly, that affords thermal but not direct hydraulic coupling. That arrangement has on the one hand the advantage that central treatment of all the inflowing fluid by the apparatus according to the invention is guaranteed and thus the whole of the fluid-filled space is consequently protected. A further positive property is that the design configuration according to the invention does not require any additional heating. That eliminates thermal energy losses and the energy for electrical heating or pumping is saved. In addition the apparatus according to the invention leaves the diffusion and convection processes in the water heater unaffected. By virtue of the arrangement of the weakly acid ion exchanger material in thermal communication with the hot water region of the water heater, optimum formation probability for crystallisation centers at the catalyst granular material prevails in the apparatus as most of the time the granular material is in the region of higher temperatures. An advantageous variant provides in that respect that the apparatus discharges crystallisation seeds into the water flowing through it.

In a further development of that concept it is particularly desirable that exclusively cold water flows into the apparatus from the cold water feed of the water heater. That in turn ensures that on the one hand all the water flowing into the water heater has to pass through the apparatus according to the invention and thus is subjected in its entirety to the water treatment according to the invention. On the other hand this embodiment guarantees that the diffusion and convection processes in the water heater are not adversely influenced by the apparatus according to the invention.

In regard to positioning of the apparatus according to the invention, it is provided that the apparatus is arranged in the interior or also as an alternative thereto at the outside wall of the water heater. If the apparatus is arranged at the outside wall of the water heater, it is particularly desirable for it to be mounted when there is heat insulation for the water heater between the outside wall of the water heater and the heat insulation. When mounted to the outside wall of the water heater it is particularly necessary to ensure that only materials which are very good conductors of heat are used between the apparatus according to the invention and the outside wall of the water heater so that optimum transfer of heat takes place between the hot water region and the apparatus according to the invention.

Both for optimum reduction in calcification and also for rendering the catalyst granular material hygienic by means of thermal disinfecting, it is particularly desirable for the hot water region of the water heater with which the apparatus is in good heat-conductive thermal communication to be at a minimum temperature of 55° C.

In addition it is particularly desirable if the water outlet of the apparatus has a conduit which extends into the lower region of the water heater—preferably into the immediate proximity of the heating means of the water heater. As an alternative thereto it is provided that the water outlet of the apparatus is arranged directly in the lower region of the water heater—preferably in the immediate proximity of the heating means of the water heater. These embodiments ensure that the cold or only slightly heated water which flows into the water heater from the cold water feed of the water heater by way of the apparatus according to the invention does not interfere with the convection and diffusion processes in the water heater. In these embodiments, the comparatively cool water, as is otherwise usual, passes into the water heater in the lower region thereof, it is then heated by the heating means of the water heater and rises in the water heater, in accordance with the undisturbed convection and diffusion processes. Convection, water transport and temperature layering in the water heater are therefore not disturbed.

A further variant provides that the water-treating substance can be backflushed. In that respect it is particularly desirable if the apparatus has at least one bypass, wherein the bypass permits backflushing—preferably of the water-treating substance—of the apparatus.

In regard to the design configuration of the apparatus according to the invention it is desirable if the apparatus has at least one cartridge with a sieve or filter bottom and an outlet nozzle, wherein the water-treating substance is arranged in the cartridge. This arrangement ensures on the one hand that cold water can flow through the water-treating substance in the optimum fashion in the apparatus while on the other hand the water-treating substance is prevented by the sieve bottom and the outlet nozzles from being flushed out of the apparatus.

A particularly desirable embodiment provides that the apparatus has at least one inner cartridge—preferably with sieve or filter bottom and/or outlet nozzle—, wherein the water-treating substance is arranged in the inner cartridge and the apparatus has a cartridge receiving means which is arranged in the cold water feed of the water heater, wherein the inner cartridge can be introduced—preferably replaceably—into the cartridge receiving means. This alternative configuration therefore provides that the outer cartridge as well as the water inlet and the water outlet of the apparatus, for water treatment, are installed fixedly in or on the water heater, while the inner cartridge which preferably contains the water-treating substance on the one hand can be easily exchanged and renewed or on the other hand can be replaced by other cartridges with other water-treating devices. Exchange or renewal of the actual water-treating substance or the actual water-treating device is thus a particularly simple matter with this embodiment and can be implemented at little technical complication and expenditure.

A further variant provides that the apparatus is arranged in the upper half—preferably the upper third—of the water heater.

BRIEF DESCRIPTION OF THE SEVERAL VIEWS OF THE DRAWING

Further features and details of the present invention are apparent from the specific description hereinafter in which.

DETAILED DESCRIPTION OF THE INVENTION

In a typical single-family or two-family residence water is always drawn discontinuously, that is to say the water is still for the longest period of time, and that stagnation time can be used to heat the catalyst granular material to a temperature which is preferably over 55° C. Each time that water is drawn off, the water which is enriched with crystallisation centers is flushed into the boiler.

As a means for safeguarding against an increased pressure and a backflow has to be provided for safe reliable operation of the hot water storage unit, there is no need to provide any further measures. A suitable by-pass in order to be able to regularly back-flush the apparatus is sensible and useful for long-term operation.

Figure 1:
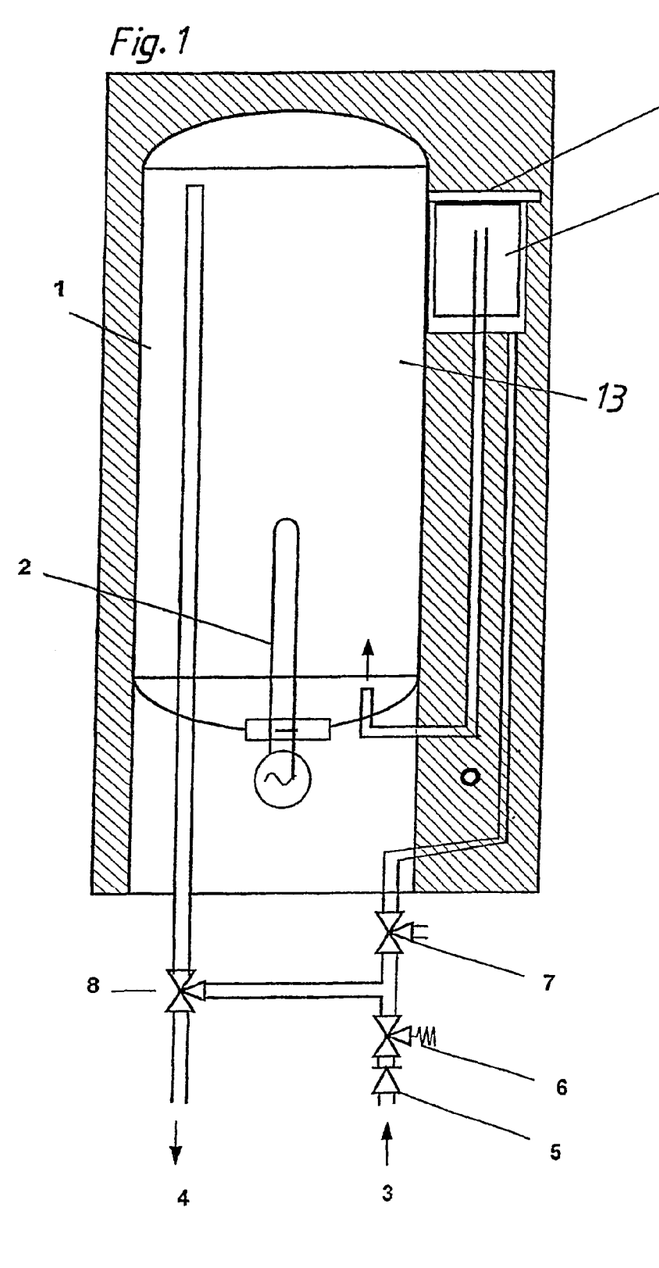
FIG. 1 shows an embodiment of the apparatus according to the invention, which is mounted to the outside wall of a water heater.

FIG. 1 shows as an example integration of a water treatment unit into the cold water feed of a wall-mounted electric boiler: the boiler has a hot water container 1 and an (electrical) heating element 2 disposed on a heating flange. The cold water flows into the boiler by way of the cold water supply conduit 3. The hot water is drawn off by way of the hot water draw-off conduit 4. A backflow-preventing device 5 prevents the hot water from flowing back into the cold water installation. The increased-pressure valve 6 provides a safeguard against dangerously increased pressures. The valves 7 and 8 permit backflushing of the water treatment unit. The water treatment apparatus has a pressure-resistant cartridge 9.

In FIG. 1 cartridge heating is effected by way of a heating block 10. The heating block which is made for example from aluminum or copper is fixed with a heat-conducting adhesive in the upper region of the storage unit to the metal outside wall thereof.

Figure 2:
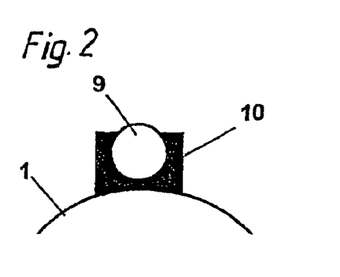
FIG. 2 shows a plan view of an embodiment of the apparatus according to the invention.

FIG. 2 is a diagrammatic view of the heating block 10. The function thereof involves the optimum transmission of the heat energy from the hot water region 13 through the boiler wall to the cartridge. The heating block with cartridge and the cold water supply conduit are ideally integrated into the thermal insulation of the boiler.

In a second embodiment according to the invention the cold water feed is passed into the hot water storage unit and the feed water is passed through a container (or a cartridge) which contains the catalyst granular material and which is itself disposed in the interior of the storage unit. The container or the cartridge is preferably disposed in a region of the storage unit, which is at a minimum temperature of 55° C. In that case, the arrangement not only guarantees optimum water treatment but also guarantees that the granular material is constantly being subjected to hygienisation. For, as already mentioned above, water is usually drawn from the storage unit discontinuously. In the stagnation phases the granular material is heated to the temperature of its surroundings. At temperatures above 55° C. microorganisms are effectively destroyed and the catalyst granular material remains hygienically impeccable. In order not to disturb a temperature layering effect which is present in the water heater, it is desirable for the treated water not to be allowed to pass into the hot water region 13 thereof and to flow therefrom. It is much more desirable, as shown for example in FIG. 3, if the water which flows into the water heater 1 from the apparatus (=water treatment unit) is passed by way of a conduit directly into the lower, relatively cold region of the hot water container 1 and only there flows into the hot water container 1. Regular backflushing of the cartridge is necessary for ongoing operation without complaint of such an arrangement. A suitable valve assembly for carrying out the backflushing procedure is desirable.

The advantages of this arrangement are that there is no need for a pressure-resistant cartridge and separate heating means for satisfactory operation.

Figure 3:
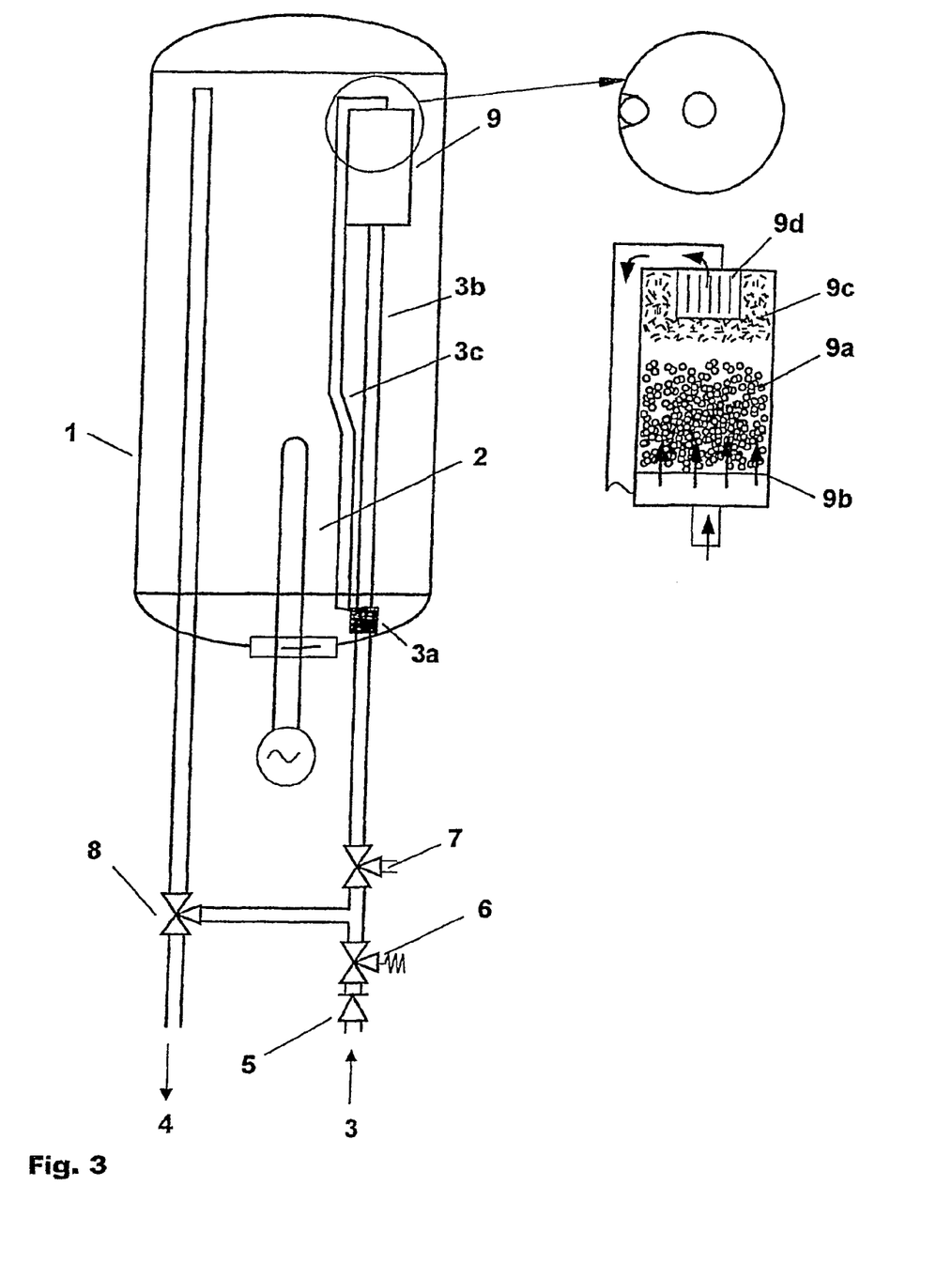
FIGS. 3 through 7 and FIG. 9 show alternative configurations disposed in the water heater.

FIG. 3 shows the embodiment of this concept by means of the example of a wall-mounted electrical storage unit: the boiler comprises a hot water container 1 and an electrical heating element 2 on a heating flange. The cold water flows into the boiler by way of the cold water supply conduit 3. The hot water is drawn off by way of the hot water draw-off conduit 4. A backflow-preventing device 5 prevents the hot water from flowing back into the cold water installation. The over-pressure valve 6 provides a safeguard against dangerous over-pressures. The valves 7 and 8 permit backflushing of the water treatment unit. The water treatment unit comprises an adaptor 3a, a pipe 3b, the catalyst cartridge 9 and a backflow pipe or hose 3c. The adaptor 3a permits the water treatment unit to be easily fitted on to the cold water supply conduit 3.

If there is a wish for existing electrical storage units to be retrofitted, then particular attention must be paid to the design of the adaptor in order to permit simple mounting and simple replacement of the water treatment unit. The materials of the water treatment unit can be metal, but it is particularly advantageous to adopt a structure of heat-resistant plastic materials, for example polypropylene. The cartridge 9 does not have to be pressure-resistant and contains the catalyst granular material 9a, the flow paths in the cartridge are defined by the sieve or filter bottom 9b, the inert granular material 9c and the outlet nozzle 9d. Other cartridge configurations are also possible.

Figure 4:
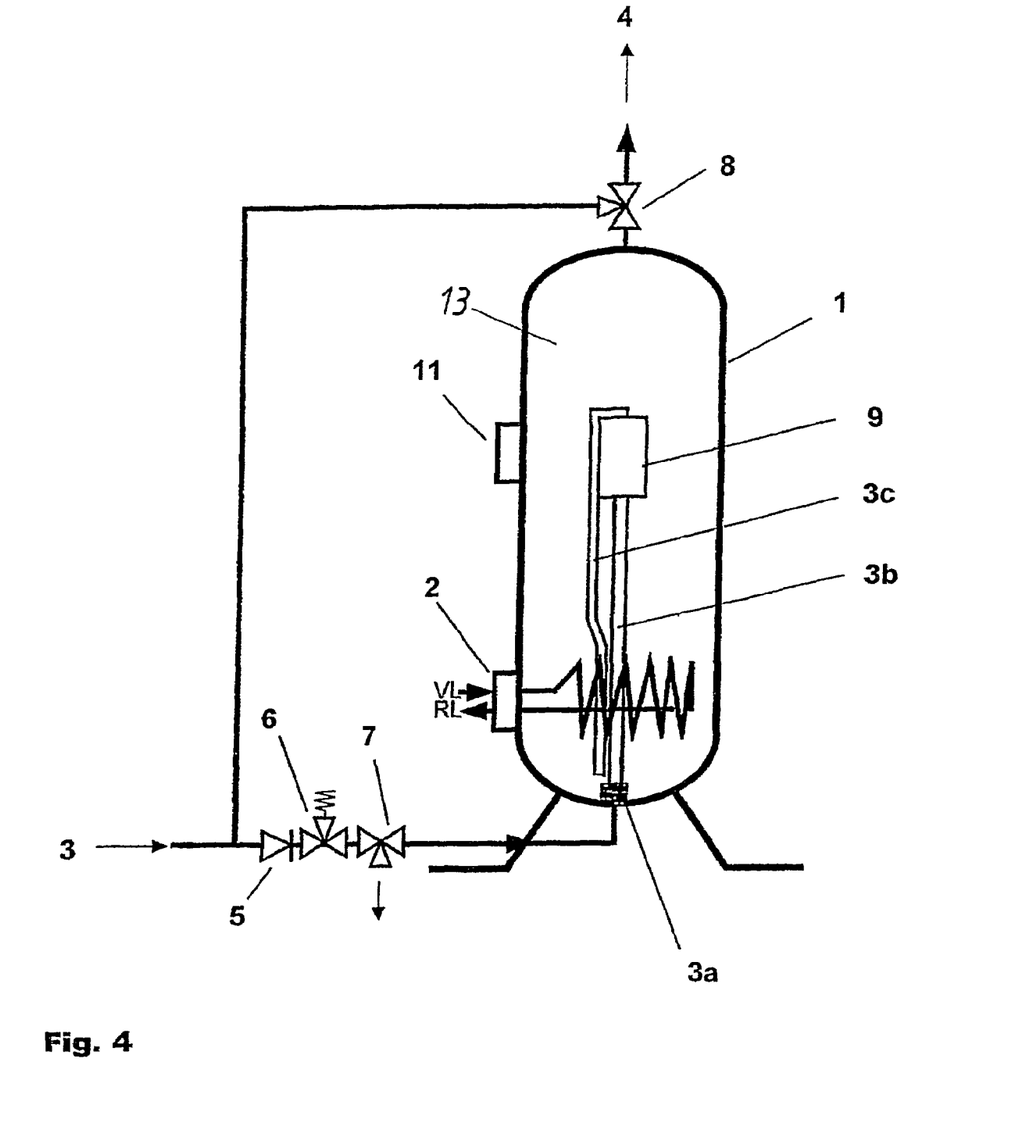

FIG. 4 shows an embodiment relating to integration of the water treatment unit on the example of a freestanding boiler. In this case the cold water supply conduit 3 is extended into the boiler, with a pipe 3b; that pipe which consists of metal or plastic material is either welded or screwed into a socket or fitted by way of a suitable adaptor 3a on to the water entry into the boiler. As shown in FIG. 3 a cartridge 9 with catalyst granular material is fitted on the pipe 3b. A pipe or hose connection 3c carries the outgoing treated water back into the lower region of the storage unit. The structure of the water treatment unit should be such that it can be easily maintained by way of the heating flange 2; in the case of many freestanding boilers there is a second heating flange 1 which permits even easier maintenance of the cartridge. The functional elements 1–8 have already been described with reference to FIG. 1.

Figure 5:
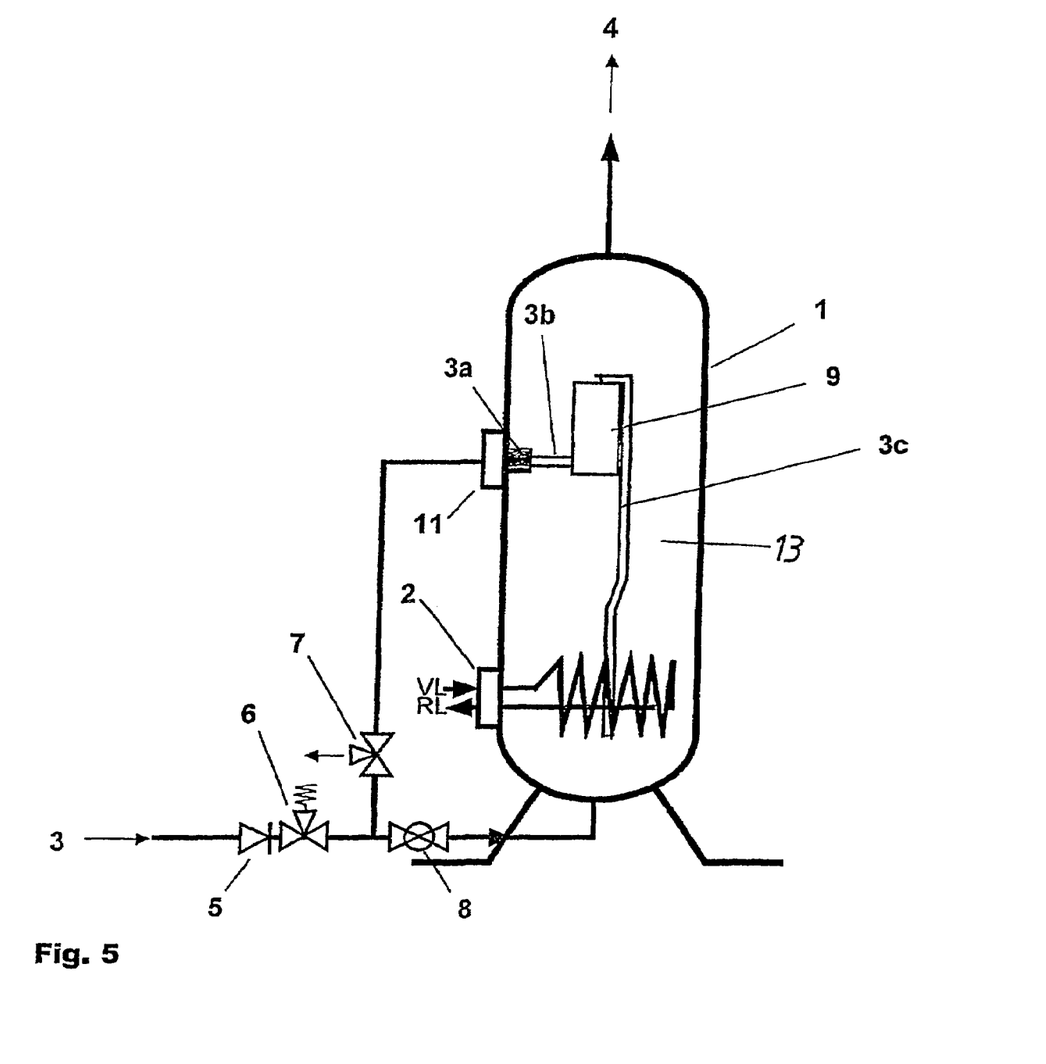

FIG. 5 shows a further variant by means of the example of a freestanding boiler. In this example the water treatment unit is introduced into the boiler, mounted to a fixed holding flange 11. The cold water feed 3 is also effected by way of that flange. The mode of operation is otherwise as described with reference to FIG. 1. In this variant, it is desirable for the water treatment unit to be of such a structural configuration that the entire water treatment unit can be installed by way of the flange opening. That can be most easily implemented by means of a 4-part system: the pipe or hose connection 3c is firstly introduced by way of the flange opening (flexible pipe or hose); then the cartridge 9 is introduced into the boiler by way of the flange opening and the pipe or hose 3c is joined to the cartridge. In the next step the pipe 3b is non-rotatably connected to the cartridge 9. The pipe 3b can be drawn somewhat out of the flange opening so that it can be easily fitted (non-rotatably) on to the adaptor 3a which is mounted to the holding flange. Finally the holding flange is screwed to the boiler and the cold water feed produced.

Figure 6:
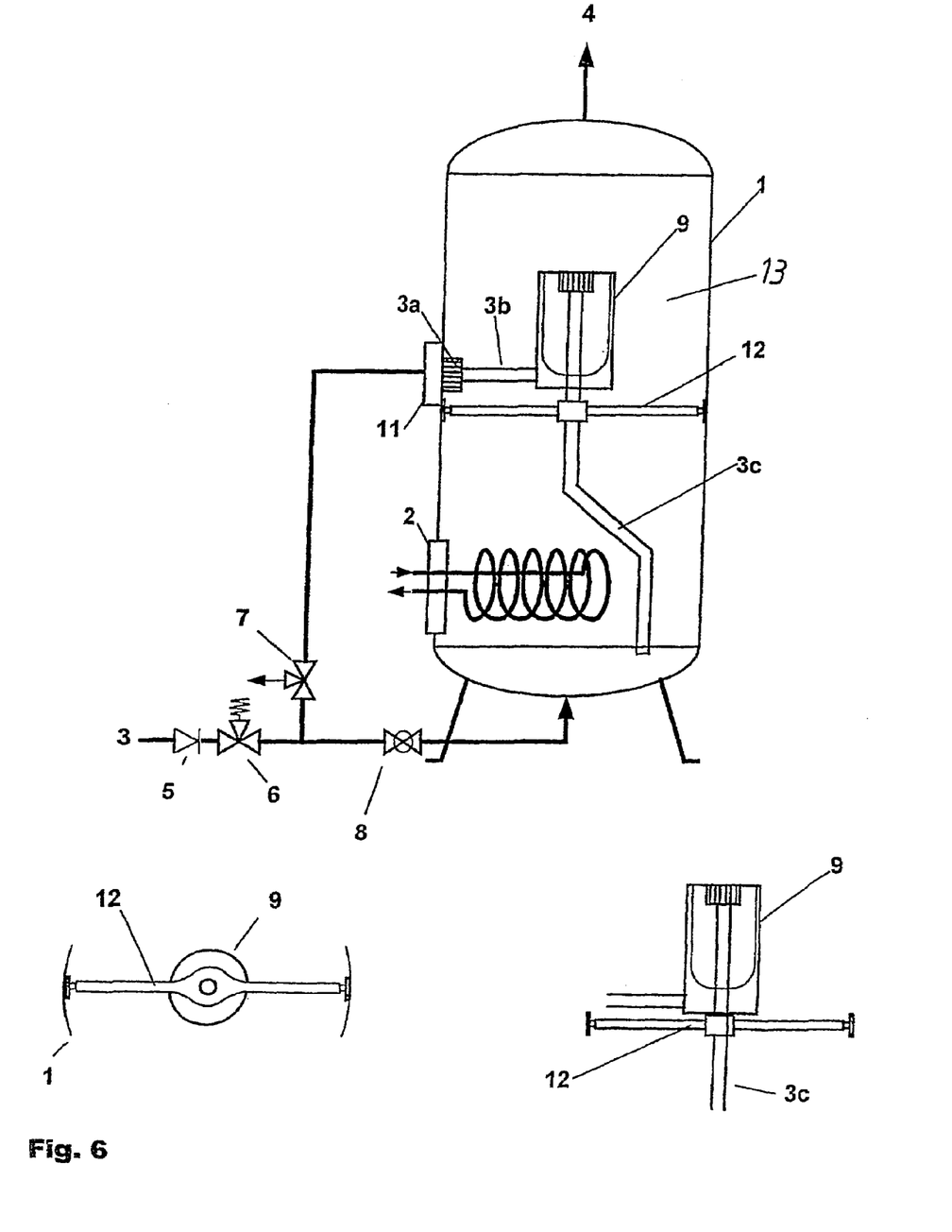

FIG. 6 shows a variant which is similar to FIG. 5, wherein mounting of the water treatment unit is particularly facilitated by a guide rail 12 which can be spread in the storage unit. After the guide rail 12 has been spread the return pipe 3c is inserted and the cartridge 9 fitted on. After the feed pipe 3b has been fixed to the cartridge 9 the holding flange 11 is fitted on, being connected to the feed pipe by way of the adaptor 3a. Otherwise connection and operation are as described with reference to FIG. 5.

Figure 7:
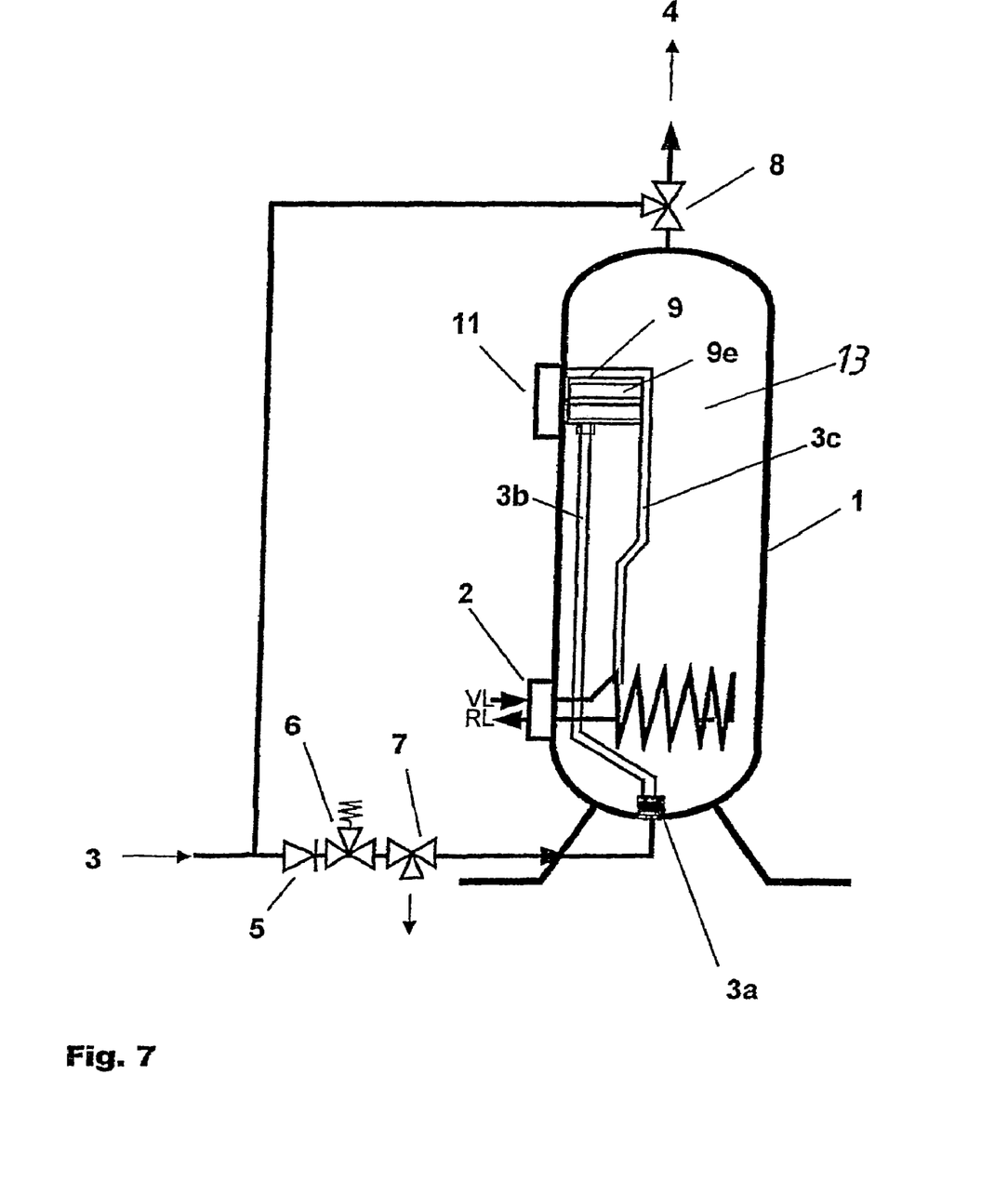
Figure 8:
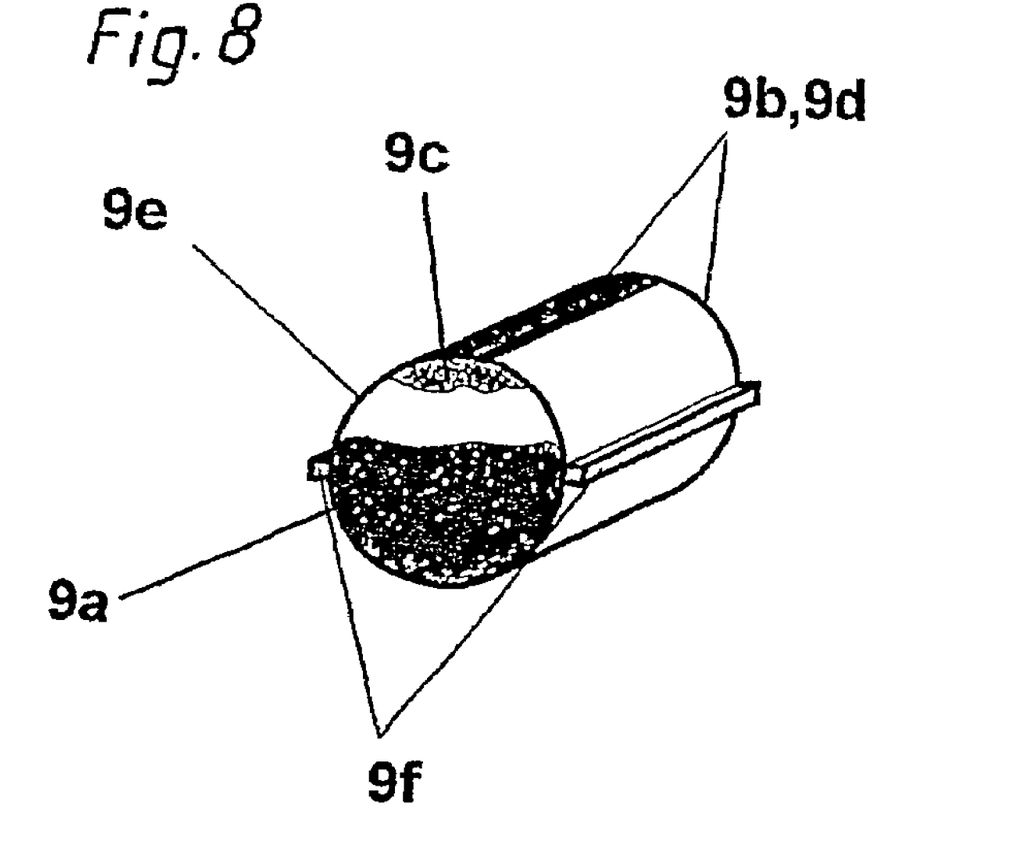
FIG. 8 shows a cartridge with a catalyst granular material.

FIG. 7 shows a further variant, in which respect it is assumed that the cold water supply conduit 3b and the return flow conduit 3c are mounted in fixedly cased relationship together with a cartridge receiving means 9 in the storage unit. An inner cartridge 9e with the catalyst granular material 9a and the inert granular material 9c (see FIG. 8) is installed and removed directly by way of a holding flange 11. The sieve bottom 9b and the outlet nozzle 9d are in the form of fine slots in the casing of the inner cartridge, and two sealing lips 9f separate the feed and discharge sides.

Figure 9:
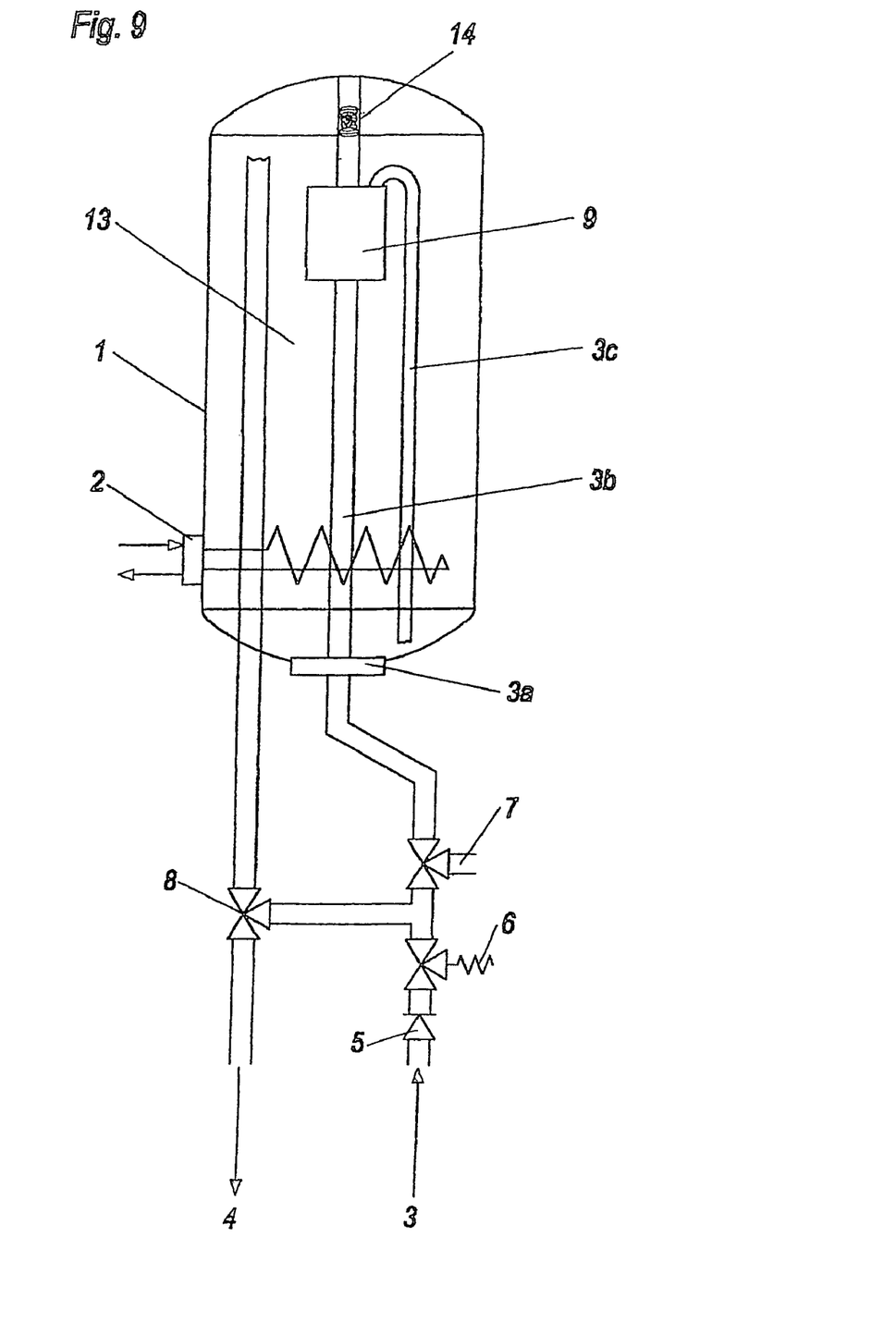

In the variant illustrated in FIG. 9 the cartridge 9 is simply spread and strutted in the water heater 1 by means of the pipe 3b and the pipe 14 which is elastic in the longitudinal direction. In this case the pipes 3b and 14 are preferably made from plastic material which is suitable for foods. The pipe 3b in this case functions as a cold water feed to the cartridge 9. By means of the adaptor 3a, the pipe 3b together with the cartridge 9 and the pipe 14 is simply fitted on to the cold water supply conduit 3. In this case it is desirable for the adaptor 3a to be of such a configuration that, upon being fitted on to the cold water supply conduit 3, it surrounds it in water-tight relationship, so that no further installation operations are necessary to ensure a fluid-tight connection between the adaptor 3a and the cold water supply conduit 3. In the embodiment illustrated in FIG. 9 the fact that the pipe 14 is of an elastic property in the longitudinal direction (here symbolically represented by a spring) provides for strutting spreading of the arrangement which comprises the pipe 14 and the pipe 3b, the adaptor 3a and the cartridge 9. In this case, as illustrated, the elastic properties in the longitudinal direction of the pipe 14 can be afforded by a spring but also by deformation of a pipe 14 which is of a rubber-elastic nature in the longitudinal direction. It is likewise equally possible to mount a similar spreading device in the pipe 3b. In this case the pipe 14 can be of a rigid nature. The water which passes into the cartridge from the cold water supply conduit 3 through the pipe 3b is passed, after treatment thereof in the cartridge 9, by way of the return flow pipe or the return flow hose 3c back into the lower region of the water heater 1. This variant forms a particularly simple possible option in terms of installation of the cartridge 9.

Overall the invention is not limited to the illustrated embodiments. Thus in a variant (not shown here) of the embodiment illustrated in FIG. 7 the holding flange 11 can also be mounted directly at the top on the water heater or boiler. That permits inter alia simple maintenance and mounting of the inner cartridge from above.

In the illustrated embodiments cold water from the public mains system flows through the cold water feed. However the term 'cold water feed' is to be viewed more widely in accordance with the invention. It is also possible here for water which has already been pre-heated, for example from a preliminary boiler stage or from a mixing device between hot and cold water, to flow into the boiler or the apparatus for physical water treatment. On the basis of the good heat-conductive thermal communication with the hot water region of the water heater that inflowing water can then be raised to a higher temperature in the apparatus for the physical water treatment.

The invention claimed is:

1. A water heater having a cold water feed line and a hot water region comprising an apparatus for the physical treatment of drinking water for reducing calcification, wherein said apparatus has at least one water inlet and at least one water outlet, and wherein said apparatus is arranged in the cold water feed line of said water heater and is in good heat-conductive thermal communication with the hot water region of said water heater and in addition has a modified weakly acid ion exchanger material for catalytic lime precipitation as at least one water-treating substance.

2. A water heater as set forth in claim 1, wherein exclusively water from said cold water feed of said water heater flows into said apparatus.

3. A water heater as set forth in claim 1, wherein said apparatus is arranged in an interior of said water heater.

4. A water heater as set forth in claim 1, wherein said apparatus is arranged at an outside wall of said water heater.

5. A water heater as set forth in claim 4, wherein said apparatus is arranged within a thermal insulation of said water heater.

6. A water heater as set forth in claim 1, wherein said hot water region of said water heater with which said apparatus is in good heat-conductive thermal communication is at a minimum temperature of 55° C.

7. A water heater as set forth in claim 1, wherein said water outlet of the apparatus has a conduit which extends into a lower region of said water heater.

8. A water heater as set forth in claim 7, wherein said conduit extends into an immediate proximity of a heating means of said water heater.

9. A water heater as set forth in claim 1, wherein said water outlet of said apparatus is arranged in a lower region of said water heater.

10. A water heater as set forth in claim 9, wherein said water outlet of said apparatus is arranged in an immediate proximity of a heating means of said water heater.

11. A water heater as set forth in claim 1, wherein said apparatus discharges crystallization seeds into the water flowing through it.

12. A water heater as set forth in claim 1, wherein said water-treating substance is backflushable.

13. A water heater as set forth in claim 1, wherein said apparatus has at least one bypass, wherein the bypass permits backflushing of said water-treating substance of said apparatus.

14. A water heater as set forth in claim 1, wherein said apparatus has at least one cartridge comprising a filter bottom and outlet nozzles, wherein said water-treating substance is arranged in said cartridge.

15. A water heater as set forth in claim 1, wherein said apparatus has at least one inner cartridge with a filter bottom and outlet nozzle, and wherein said water-treating substance is arranged in said inner cartridge and said apparatus has a cartridge receiving means which is arranged in said cold water feed of said water heater, wherein said inner cartridge can be introduced into said cartridge receiving means.

16. A water heater as set forth in claim 15, wherein said inner cartridge can be introduced replaceably into said cartridge receiving means.

17. A water heater as set forth in claim 1, wherein said apparatus is arranged in an upper half or in an upper third of said water heater.

18. A water heater as set forth in claim 1, wherein said water heater is a boiler.

19. A water heater as set forth in claim 1, wherein said modified weakly acid ion exchanger material is in Ca-form or in the form of granular material.

* * * * *